United States Patent
Gronau et al.

(10) Patent No.: US 7,174,247 B2
(45) Date of Patent: Feb. 6, 2007

(54) METHOD FOR IMPROVING THE REGULATORY BEHAVIOR OF MOTOR VEHICLE REGULATORY SYSTEMS

(75) Inventors: Ralph Gronau, Wetter (DE); Jürgen Woywod, Mörfelden (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 10/507,974

(22) PCT Filed: Apr. 2, 2003

(86) PCT No.: PCT/EP03/03426

§ 371 (c)(1),
(2), (4) Date: Sep. 15, 2004

(87) PCT Pub. No.: WO03/082645

PCT Pub. Date: Oct. 9, 2003

(65) Prior Publication Data

US 2005/0171671 A1    Aug. 4, 2005

(30) Foreign Application Priority Data

Apr. 3, 2002 (DE) ............... 102 14 748
Mar. 5, 2003 (DE) ............... 103 09 418

(51) Int. Cl.
*B60T 8/34* (2006.01)
*B60T 8/40* (2006.01)

(52) U.S. Cl. ............... 701/70; 701/78; 303/114.1

(58) Field of Classification Search ............... 701/70, 701/71, 76, 78, 83, 92; 303/114.1, 113.4, 303/113.5, 115.1, 166, 115.4, 116.1; 188/181 A, 188/181 C See application file for complete search history.

(56) References Cited

U.S. PATENT DOCUMENTS 5,174,636 A * 12/1992 Burgdorf et al. ......... 303/116.1

(Continued)

FOREIGN PATENT DOCUMENTS

DE    39 30 890 A1    3/1991

(Continued)

OTHER PUBLICATIONS

International Search Report of Application No. PCT/EP03/03426 dated Jul. 23, 2003.

(Continued)

*Primary Examiner*—Dalena Tran
(74) *Attorney, Agent, or Firm*—RatnerPrestia

(57) ABSTRACT

The invention relates to a method for improving the control behavior of motor vehicle control systems such as ABS, ESP, etc. comprising electrically driven hydraulic pumps, inlet and outlet valves and low-pressure accumulators, wherein the low-pressure accumulators accommodate, at least in part, pressure fluid that is discharged from wheel brakes in a control operation, wherein the hydraulic pumps are used to return the pressure fluid into a master cylinder, in particular tandem master cylinder, wherein the delivery behavior of the hydraulic pumps is controlled in dependence on pressure values, and wherein the actuation of the hydraulic pumps takes place in conformity with demand, i.e. by evaluating slip variation, wherein in a pressure increase phase, the pressure fluid is intermediately stored in the low-pressure accumulators and there is no return delivery of the pressure fluid into the master cylinder until either a pressure increase phase or pressure buildup commences, or a critical filling level of the low-pressure accumulator necessitates actuation of the hydraulic pumps for safety reasons, with the result of balancing the volume flow demand and the delivery volume flow and thus achieving a reduction of vibrations of the brake pedal. Further, the invention relates to a computer program product defining an algorithm that comprises a method for improving the control behavior of motor vehicle control systems.

17 Claims, 1 Drawing Sheet

U.S. PATENT DOCUMENTS

| | | | | |
|---|---|---|---|---|
| 5,378,055 | A | * | 1/1995 | Maas et al. ............... 303/113.1 |
| 5,560,688 | A | * | 10/1996 | Schappler et al. ............. 303/3 |
| 5,918,949 | A | * | 7/1999 | Volz et al. ................ 303/115.4 |
| 6,050,652 | A | * | 4/2000 | Kolbe et al. ................. 303/112 |
| 6,155,653 | A | * | 12/2000 | Borchert ....................... 303/11 |
| 2004/0080208 | A1 | * | 4/2004 | Giers et al. ................... 303/20 |

FOREIGN PATENT DOCUMENTS

| | | |
|---|---|---|
| DE | 39 36 386 A1 | 5/1991 |
| DE | 41 04 068 A1 | 8/1992 |
| DE | 42 22 954 A1 | 1/1994 |
| DE | 42 23 602 A1 | 1/1994 |
| DE | 42 32 614 A1 | 3/1994 |
| DE | 195 25 538 A1 | 1/1996 |
| DE | 44 40 517 A1 | 5/1996 |
| DE | 196 32 311 A1 | 2/1998 |
| DE | 197 08 142 A1 | 9/1998 |
| DE | 197 31 413 A1 | 1/1999 |
| DE | 198 16 290 A1 | 4/1999 |

OTHER PUBLICATIONS

German Search Report of Application No. 103 09 418.0 dated Oct. 21. 2003.

* cited by examiner

METHOD FOR IMPROVING THE REGULATORY BEHAVIOR OF MOTOR VEHICLE REGULATORY SYSTEMS

TECHNICAL FIELD

The present invention relates to a method for improving the control behavior of motor vehicle control systems such as ABS, ESP, etc. comprising electrically driven hydraulic pumps, inlet and outlet valves and low-pressure accumulators, wherein the low-pressure accumulators accommodate, at least in part, pressure fluid that is discharged from wheel brakes in a control operation, wherein the hydraulic pumps are used to return the pressure fluid into a master cylinder, in particular tandem master cylinder, wherein the delivery behavior of the hydraulic pumps is controlled in dependence on pressure values, and wherein the actuation of the hydraulic pumps takes place in conformity with demand, i.e. by evaluating slip variation, and a computer program product.

BACKGROUND OF THE INVENTION

DE 19632311 A1 discloses a control strategy for the actuation of a pump based on a pressure volume model, wherein the pump actuation is performed under the aspect of giving priority to the evacuation of the low-pressure accumulators. In this arrangement, the delivery rate of the hydraulic pump is dimensioned such that the time period between two successive phases of brake pressure reduction is sufficient for the complete evacuation of the low-pressure accumulators.

The prior-art pump actuation impairs the pedal comfort because the delivery volume flow is not in balance with the volume flow required (pressure increase pulses). Especially in situations where there is no risk of filling the low-pressure accumulators or when the pilot pressure exceeds the locking pressure level only slightly, a conventional pump actuation of this type is uncomfortable or even impairs the control quality (e.g. on a low coefficient of friction) because the pilot pressure is significantly modified due to an unbalanced return delivery. This change of the pilot pressure causes the known vibrating of the brake pedal during ABS intervention. The vibrating is the result of the brake pedal displacing in the direction of the vehicle bottom when pressure is built up because volume is consumed in a control operation. Hence, the brake pedal is moved in an opposite direction, towards the driver's foot, superimposed by the delivery pump's activity.

BRIEF SUMMARY OF THE INVENTION

In view of the above, an object of the invention is to provide a method that significantly reduces any unwanted movement (vibrating) of the brake pedal during an ABS intervention by way of a purposeful pump actuation so that the pedal comfort is enhanced and the control quality improved, in particular in low coefficients-of-friction situations.

This object is achieved according to the invention by means of the described method for improving the control behavior of motor vehicle control systems.

It is preferred according to the method of the invention that the critical filling level of the low-pressure accumulator is fixed in response to vehicle-related conditions such as the variation of slip, wheel acceleration, pilot pressure, locking pressure level, etc. In a particularly preferred fashion, the critical filling level of the low-pressure accumulator is fixed by means of characteristic curves.

Further, it is preferred that in a pressure increase phase the pressure fluid is returned by means of the hydraulic pumps from the low-pressure accumulators into the master cylinder in such a fashion that the volume flow demand of the wheel brake is provided to the greatest possible extent by the delivery volume flow of the hydraulic pump so that any unwanted pedal movement due to volume flow differences is minimized.

It is also preferred that the volume flow demand of the wheel brake is stored in the form of volume characteristic curves.

The hydraulic pump is preferably actuated in response to the volume characteristic curves.

The invention also relates to a computer program product comprising the method of the invention.

DETAILED DESCRIPTION OF THE PREFERRED EMBODIMENTS

Figure 1:
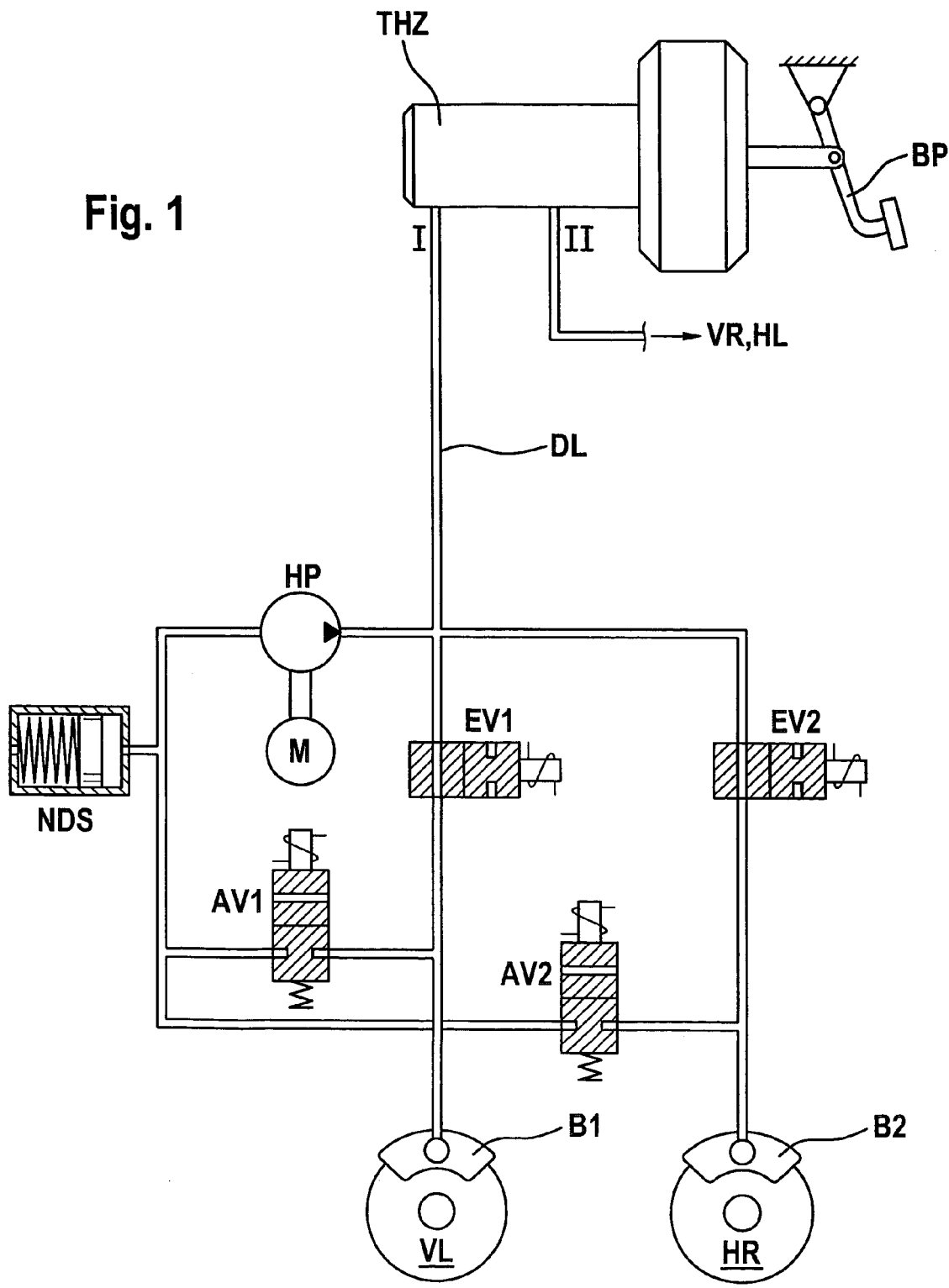
FIG. 1 shows a schematic design of a brake circuit of a vehicle with ABS control.

Only one of the usually two brake circuits is shown in FIG. 1 for the sake of clarity. Two brake circuits I, II are connected to a tandem master cylinder THZ. The wheel brake B1 of the left front wheel VL and the wheel brake B2 of the right rear wheel HR are connected to the brake circuit I in the embodiment shown. It is of course also feasible to allot the brake circuits to the front axle and the rear axle. Inlet valves EV1, EV2 being configured as normally open (NO=open in their de-energized state) valves are arranged in the pressure fluid lines DL between the tandem master cylinder THZ and the wheel brakes B1, B2. Said inlet valves EV1, EV2 can be closed in an ABS control intervention to temporarily prevent further pressure buildup in the wheel brake by means of the tandem master cylinder THZ. When pressure reduction is necessary during ABS control, the excessive pressure fluid can be discharged through outlet valves AV1, AV2. Said outlet valves AV1, AV2 are configured as normally closed valves (NC=closed in their de-energized state). The excessive pressure fluid is intermediately stored in a low-pressure accumulator NDS and returned by a hydraulic pump HP driven by a motor M in front of the inlet valves EV1, EV2. A return delivery of the pressure fluid takes place only when a pressure increase phase or pressure buildup commences through the inlet valve or a critical filling level of the low-pressure accumulator NDS necessitates actuation of the hydraulic pump for safety reasons. The pressure buildup being expected or the increase gradients of the wheel brakes B1, B2 being expected is calculated by means of a pressure sensor (e.g. in the tandem master cylinder) or by creating a pressure model. This function is already utilized in order to determine the wheel pressure reproduced in a model, and the pressure increase is likewise stored in the form of volume characteristic curves. The volume flow of the hydraulic pump HP is likewise known or can be assessed in the different actuations. Now the required pump actuation is calculated from the stored volume characteristic curve of the wheel brakes B1, B2.

The actuation is executed in consideration of the drifting of the hydraulic pump HP when said produces a still sufficient amount of volume flow. Drifting of the hydraulic pump HP is considered at a decreasing rate in order to ensure return delivery at a high pedal counterpressure (by way of the driver's foot). At low pilot pressures, drifting becomes a problem when actuation is initiated directly before a pressure reduction phase. This is especially the case when slip conditions prevail at several wheels. In this situation, a pressure reduction announcing itself (inlet valves closed) is detected by evaluation of the wheel acceleration and/or the slip variations (ACCF response, pause doubling), and pump actuation can be suppressed so that drifting does not continue until the reduction phase.

Also, the reduced actuation of the hydraulic pump HP or the suppression of the actuation has a decisive advantage in terms of control technology on low coefficients of friction, in connection with pilot pressures being only slightly in excess of the locking pressure level. In this situation, a rise of the pilot pressure because of the return delivery is avoided as no pressure fluid is conducted in front of the inlet valves, which would have as a result a tandem master cylinder pressure increase in this situation that is significant in relation to the prevailing locking pressure level due to the delivery 'against the driver's pilot pressure'. Hence, the calculation of the buildup, which has the previous increase phase as a basis for the calculation, is not disturbed, and there is no shift from very long increase phases to very short increase phases. This enhances pedal comfort as well as the homogeneity of deceleration.

Partial filling of the low-pressure accumulator NDS can be accepted for a long period of time because no abrupt change from a low coefficient of friction to a considerably lower frictional value is allowed to occur. Only when the wheel pressures reproduced in a model or measured exhibit a value of almost zero, without a corresponding re-acceleration of the wheels being detected, will this comfort-oriented pump actuation be left and the known actuation activated.

The invention claimed is:

1. Method for improving the control behavior of motor vehicle control comprising electrically driven hydraulic pumps, inlet and outlet valves and low-pressure accumulators, wherein the low-pressure accumulators accommodate, at least in part, pressure fluid that is discharged from wheel brakes in a control operation, wherein the hydraulic pumps are used to return the pressure fluid into a master cylinder, in particular tandem master cylinder, wherein the delivery behavior of the hydraulic pumps is controlled in dependence on pressure values, and wherein the actuation of the hydraulic pumps takes place in conformity with demand,
wherein in a pressure decrease phase, the pressure fluid is intermediately stored in the low-pressure accumulators and there is no return delivery of the pressure fluid into the master cylinder until either a pressure increase phase commences, or a critical filling level of the low-pressure accumulator necessitates actuation of the hydraulic pumps for safety reasons, with the result of balancing the volume flow demand and the delivery volume flow and thus achieving a reduction of vibrations of the brake pedal.

2. Method as claimed in claim 1,
wherein a measured pilot pressure of a brake pedal is used as a pressure value.

3. Method as claimed in claim 1,
wherein the pressure value is a pressure value calculated by producing a model from values acquired on the basis of the valve actuation, the control variation etc.

4. Method as claimed in claim 1,
wherein the critical filling level of the low-pressure accumulator is fixed in response to vehicle-related conditions such as the variation of slip, wheel acceleration, pilot pressure, locking pressure level, etc., in particular by means of characteristic curves.

5. Method as claimed in claim 1,
wherein in a pressure increase phase, the pressure fluid is returned by means of the hydraulic pumps from the low-pressure accumulators into the master cylinder in such a fashion that the volume flow demand of the wheel brake is provided to the greatest possible extent by the delivery volume flow of the hydraulic pump so that pedal movements due to volume flow differences are greatly minimized.

6. Method as claimed in claim 1,
wherein the volume flow demand of the wheel brake is stored in the form of volume characteristic curves.

7. Method as claimed in claim 6,
wherein the hydraulic pump is actuated in response to the volume characteristic curves.

8. Computer program product,
wherein said product defines an algorithm comprising a method as claimed in claim 1.

9. Method for controlling a motor vehicle control system comprising at least one hydraulic pump, inlet and outlet valves and at least one low-pressure accumulator, wherein the low-pressure accumulator accommodates, at least in part, pressure fluid that is discharged from one or more wheel brakes in a control operation, wherein the at least one hydraulic pump is used to return the pressure fluid into a master cylinder, the method comprising:
controlling the delivery behavior of the at least one hydraulic pump in dependence on pressure values; and
actuating the at least one hydraulic pump in conformity with demand, wherein in a pressure decrease phase, the pressure fluid is intermediately stored in the at least one low-pressure accumulator and the at least one hydraulic pump is deactivated until either a pressure increase phase commences or a critical filling level of the low-pressure accumulator is reached.

10. Method as claimed in claim 9,
wherein a measured pilot pressure of a brake pedal is used as a pressure value.

11. Method as claimed in claim 9,
wherein the pressure value is a pressure value calculated by producing a model from values acquired on the basis of the valve actuation and the control variation.

12. Method as claimed in claim 9,
wherein the critical filling level of the low-pressure accumulator is fixed in response to vehicle-related conditions such as the variation of slip, wheel acceleration, pilot pressure, and locking pressure level.

13. Method as claimed in claim 12,
wherein the critical filling level of the low-pressure accumulator is fixed by means of characteristic curves.

14. Method as claimed in claim 9,
wherein in a pressure increase phase, the pressure fluid is returned by means of the at least one hydraulic pump from the at least one low-pressure accumulator into the master cylinder in such a fashion that a volume flow demand of the wheel brake is provided to the greatest possible extent by the delivery volume flow of the hydraulic pump so that pedal movements due to volume flow differences are greatly minimized.

15. Method as claimed in claim 14,
wherein the volume flow demand of the wheel brake is stored in the form of volume characteristic curves.

16. Method as claimed in claim 15,
wherein the hydraulic pump is actuated in response to the volume characteristic curves.

17. Computer program product,
wherein said product defines an algorithm comprising a method as claimed in claim 9.

* * * * *